(12) United States Patent
Finkelstein

(10) Patent No.: US 6,796,001 B1
(45) Date of Patent: Sep. 28, 2004

(54) HEIGHT ADJUSTABLE SUPPORT FOR FOOD SERVICE EQUIPMENT

(75) Inventor: Burl Finkelstein, Newnan, GA (US)

(73) Assignee: Kason Industries, Inc., Shenandoah, GA (US)

( * ) Notice: Subject to any disclaimer, the term of this patent is extended or adjusted under 35 U.S.C. 154(b) by 0 days.

(21) Appl. No.: 10/208,360

(22) Filed: Jul. 31, 2002

(51) Int. Cl.⁷ .............................................. B60B 33/06
(52) U.S. Cl. ................... 16/32; 16/19; 16/42 T
(58) Field of Search ............................ 16/32, 19, 18 R, 16/30, 42 T, 43, 33, 42 R

(56) References Cited

U.S. PATENT DOCUMENTS

| | | | | |
|---|---|---|---|---|
| 510,691 A | * | 12/1893 | Luethi et al. ............. | 248/188.4 |
| 615,155 A | * | 11/1898 | George ........................ | 16/44 |
| 1,204,440 A | * | 11/1916 | Hildebrandt et al. ........... | 16/19 |
| 1,271,559 A | * | 7/1918 | Feebusch ........................ | 16/21 |
| 1,408,588 A | * | 3/1922 | Wise et al. .................. | 248/314 |
| 2,134,444 A | * | 10/1938 | Harsh ............................. | 16/19 |
| 2,176,551 A | * | 10/1939 | Solem ........................... | 16/44 |
| 2,339,577 A | * | 1/1944 | Nalle ............................ | 16/19 |
| 2,365,287 A | * | 12/1944 | Nalle ............................ | 16/19 |
| 2,384,020 A | * | 9/1945 | Farson ..................... | 248/188.5 |
| 2,385,154 A | * | 9/1945 | Nalle ............................ | 16/19 |
| 2,403,338 A | * | 7/1946 | Butler .......................... | 108/64 |
| 2,534,575 A | * | 12/1950 | Conley et al. ........... | 280/405.1 |
| 2,828,578 A | * | 4/1958 | McCabe ................... | 248/188.4 |
| 4,723,633 A | * | 2/1988 | Duncan ...................... | 182/230 |
| 4,731,900 A | * | 3/1988 | Frobose ........................ | 16/38 |
| 4,918,783 A | * | 4/1990 | Chu ............................. | 16/19 |
| 5,001,808 A | * | 3/1991 | Chung .................... | 16/18 CG |
| 5,040,758 A | * | 8/1991 | Giovannetti ............. | 248/188.4 |
| 5,457,849 A | * | 10/1995 | Branson et al. ................ | 16/19 |
| 6,478,270 B2 | * | 11/2002 | Parisi et al. ............. | 248/188.8 |

OTHER PUBLICATIONS

Hardware and Accessories Engineered for Commercial Refrigeration, Food Service, and Transportation Equipment. Kason® Catalog 6 pp. 113–120.

* cited by examiner

*Primary Examiner*—John D. Walsh
(74) *Attorney, Agent, or Firm*—Baker Donelson

(57) ABSTRACT

A height adjustable support is provided for supporting food service equipment and the like at different elevations above a supporting floor. The support comprises a floor engaging member such as a leg or caster that has a threaded upright stud and a coupling having an internally threaded tubular wall threaded thereon. The support also has at least one set screw threaded channel that extends through the tubular wall and a set screw sized to be threaded through the coupling set screw threaded channel and into setting engagement with the stud. So constructed the coupling may be inserted into a bottom channel of the food service equipment with the floor engaging member stud threaded therein and set at a selected position thereby setting the equipment height.

4 Claims, 3 Drawing Sheets

HEIGHT ADJUSTABLE SUPPORT FOR FOOD SERVICE EQUIPMENT

TECHNICAL FIELD

This invention relates generally to supports for commercial food service equipment, and particularly to height adjustable legs and casters for such equipment.

BACKGROUND OF THE INVENTION

Commercial food service equipment is often supported upon a floor by legs or casters. Most equipment in commercial kitchens is set to a common work height. Adjustable legs and leveling devices are used to allow for height adjustments to achieve a common height regardless of factory preset heights. Height adjustments are also needed where the floor is not level or even.

Casters are usually not adjustable in height. Those few that are normally require different mountings than those for the fixed legs or feet that they replace. For safety these must be designed so that a leg or caster may not come off during adjustment. These thus have tended to require rather complex machined adjustment components as exemplified by that shown in U.S. Pat. No. Des 334,136.

In addition, food service equipment often needs to be adopted to either a mobile or immobile configuration at installation. For example, pizza ovens installed in a pizzeria normally have fixed legs while those installed in a convention center have casters for relocation from time to time. Ease of convertability without the need for change in the equipment's legs or leg sockets is thus desirable.

Accordingly, it is seen that a need remains for height adjustable supports for food service equipment of more simplified construction and universal application and installment. It is to the provision of such that the present invention is primarily directed.

SUMMARY OF THE INVENTION

In a preferred form of the invention a height adjustable support is provided for supporting food service equipment and the like at different elevations above a supporting floor. The support comprises a floor engaging member such as a leg or caster that has a threaded upright stud and a coupling having an internally threaded tubular wall threaded thereon. The support also has at least one set screw threaded channel that extends through the tubular wall and a set screw sized to be threaded through the coupling set screw threaded channel and into setting engagement with the stud. So constructed the coupling may be inserted into a bottom channel of the food service equipment, or into its tubular leg, with the caster or leg stud threaded therein and set at a selected position thereby setting the equipment height.

DETAILED DESCRIPTION

Figure 1:
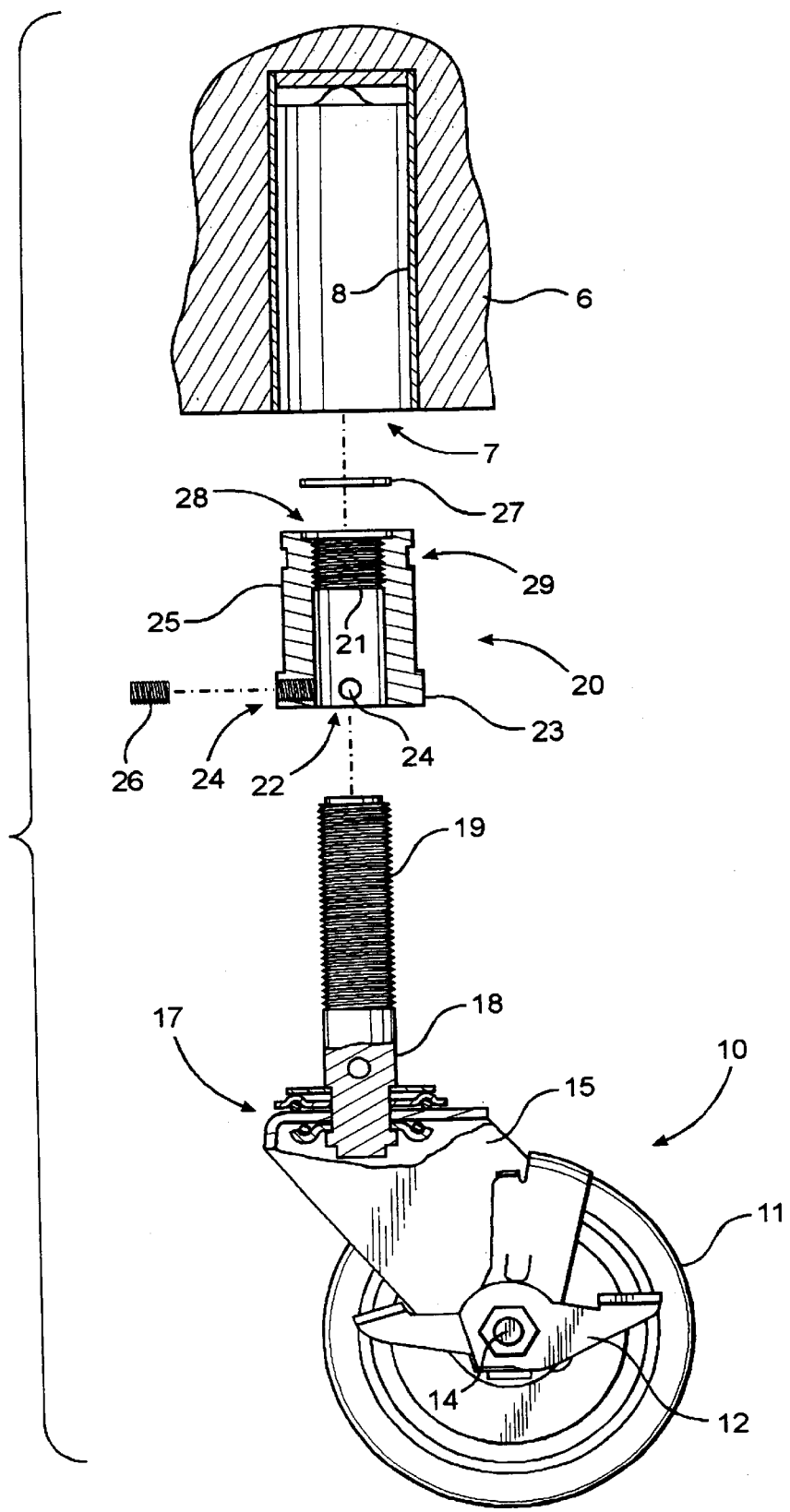
FIG. 1 is an exploded side view of a height adjustable support that embodies the invention in a preferred form shown positioned beneath the bottom of food service equipment for mounting.
Figure 2:
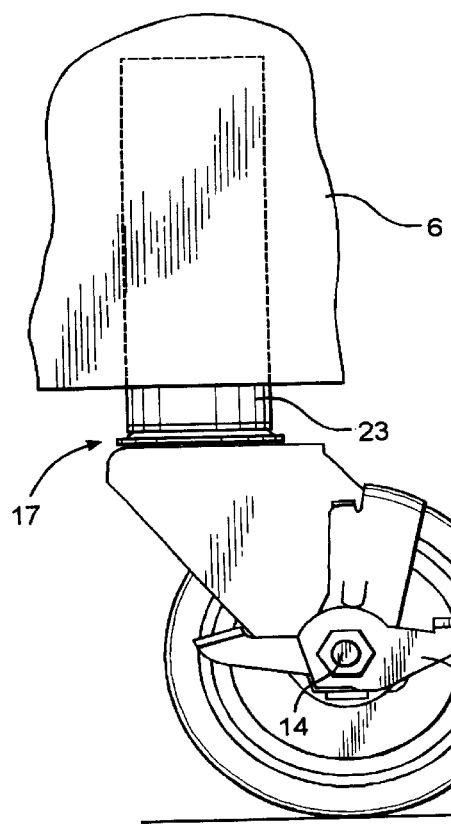
FIG. 2 is another side view of the support illustrated in FIG. 1 shown mounted to the food service equipment.

With reference now in more detail to the drawing, there is shown in FIGS. 1 and 2 a fragment of the bottom of food service equipment 6 having a channel 7 in its bottom that is lined with a liner 8. Where the food service equipment is generally rectangular, as it often is, it may have of these channels adjacent each of its four bottom corners. Of course it may have more, depending upon its size and weight. In this case the channel is cylindrical. It may however be of other shapes such as rectangular. Alternatively, the channel may be provided by a tube or tubular leg that projects downwardly from the equipment body.

Positioned beneath the equipment 6 for mounting within the channel 7 is a caster 10. The caster has a wheel 11 with brake 12 rotatably mounted to an axle 14 adjacent the bottoms of a yoke or strut 15. The top of the yoke is mounted by bearings 17 to swivel about a swivel pin or stud 18. The upper portion of the stud is seen bearing external threads 19.

Above the caster 10 is shown a tubular coupling 20 that bears internal threads 21 at the upper end of its bore 22. Two small, threaded set screw holes or channels 24 are formed in a bottom flange 23 of the side wall 25 of the coupling that extend laterally therethrough. These accommodate two set screws 26. A washer 27 is shown positioned over the coupling and a washer receiving recess 28 formed in the coupling other end. The coupling wall 25 is seen also to be formed with an annular recess 29 near its upper end. The recess 29 is provided to receive an unshown barbed lock ring.

In mounting the caster 10 to the equipment 6 the caster 10 is screwed through the coupling 20 and the washer 27 placed on the end of the caster stud 19 and staked in place. This serves to prevent the caster from thereafter being removed after maximum caster is reached. A lock ring is mounted on the coupling to prevent the caster from pulling out of the equipment channel 7, once mounted. The coupling is then inserted into the channel 7 until its flange 23 abuts the bottom of the equipment 6 and liner 8. The caster study is then threaded further into the coupling to a desired height and the set screws 26 rotated firmly adjacent the stud 18. If needed, the height may be later reset by simply loosening and resetting the set screws to insure that the equipment is firmly supported at all corners upon the floor as to change the overall height of the equipment.

Figure 4:
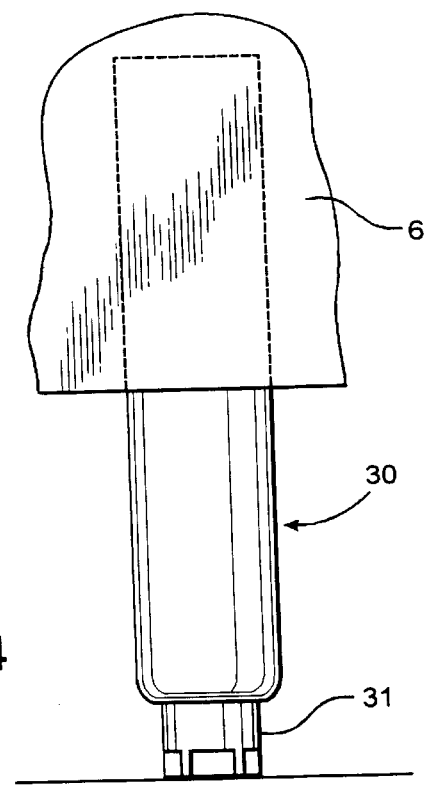
FIG. 4 is another side view of the support illustrated in FIG. 3 shown mounted to the food service equipment.
Figure 3:
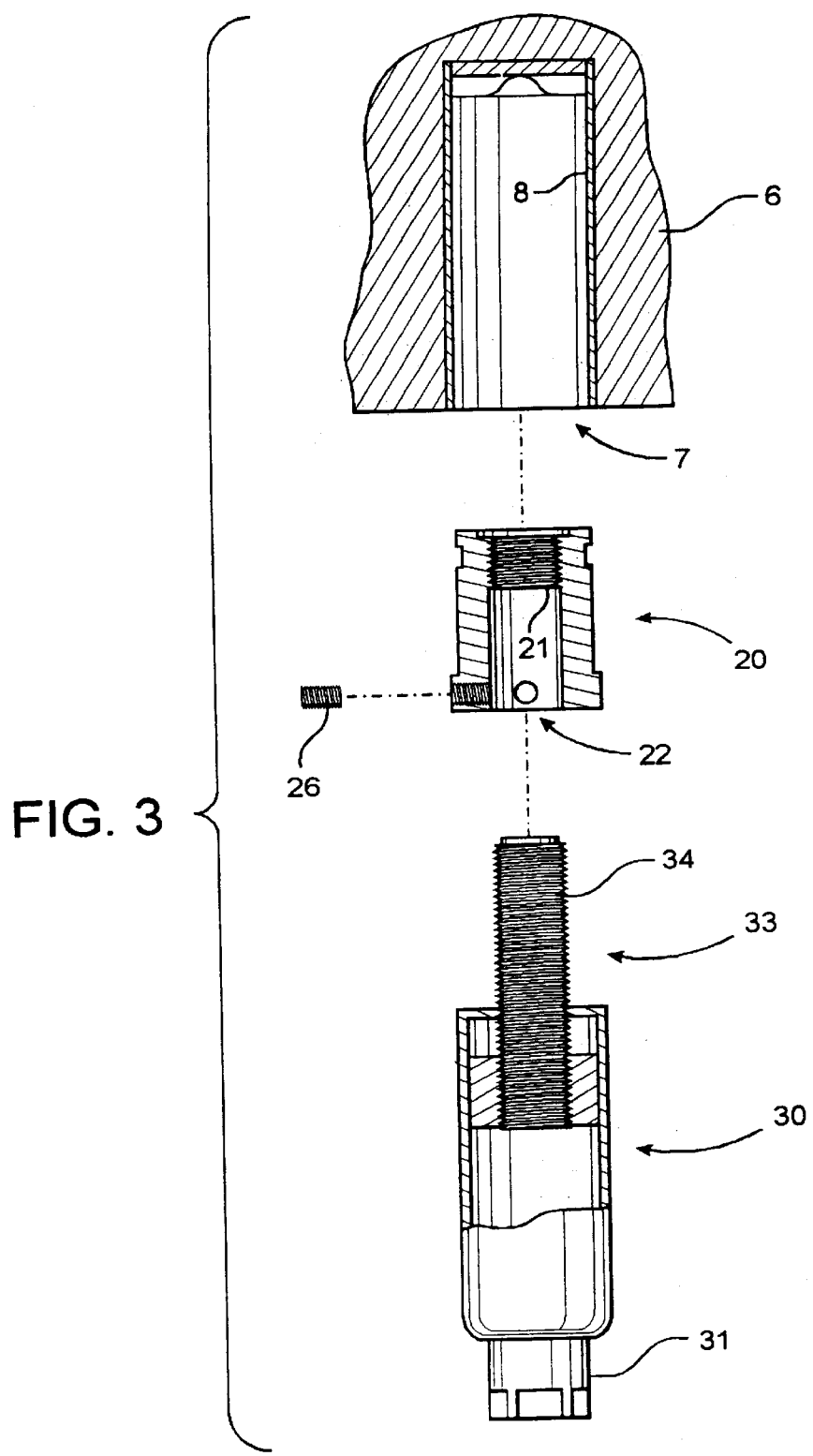
FIG. 3 is an exploded side view of a height adjustable support that embodies the invention in another preferred form and which too is shown positioned beneath the bottom of food service equipment for mounting.

With reference next to FIGS. 3 and 4 there is shown another preferred form of the invention that is immobile rather than mobile as with casters. Here a leg 30 with foot 31 has an upwardly extending stud 33 with external threads 19. It is mounted to a coupling 20 of the same construction as that shown in FIG. 1. Indeed, it may be identical. It is mounted to the coupling in the same way previously described and the coupling and leg are also mounted to the food service equipment 6 in the same way previously described.

It thus is seen that a height adjustable support is now provided for food service equipment that is of simple and safe construction. Its coupling may be mounted to either a caster of fixed leg and height adjusted and readjusted in a simple yet secure manner. Though the support is principally designed for use on food service equipment, it may of course be used on other floor supported items that need height adjustment. And though the invention has been shown and described in its preferred form, it should be understood that additions, deletions and modifications may be made without departure from the spirit and scope of the invention as set forth in the following claims.

What is claimed is:

1. A height adjustable support for supporting food service equipment at different elevations above a supporting floor, the food service equipment having a bottom channel therein, the height adjustable support comprising, a coupling sized and shaped to be received and stationarily positioned within the bottom channel to prevent relative vertical movement between said coupling and the food service equipment, said coupling having an at least partially internally threaded tubular wall defining an at least partially threaded bore and having at least one set screw threaded channel that extends through said tubular wall;

a floor engaging member having an at least partially threaded upright stud threaded into said coupling bore so that relative rotational movement between said floor engaging member and said coupling causes vertical relative movement between said floor engaging member and said coupling; and a set screw sized to be threaded through said coupling set screw threaded channel and into setting engagement with said stud, whereby the coupling is inserted into a bottom channel of the food service equipment with the floor engaging member stud threaded therein and set at a selected position thereby setting the equipment height.

2. The support of claim 1 wherein said floor engaging member is a caster.

3. The support of claim 1 wherein said floor engaging member is a leg.

4. The support of claim 1 further comprising a washer affixed to an end of said threaded stud to prevent decoupling of said stud and coupling.

* * * * *